United States Patent
Vasilyev et al.

(10) Patent No.: US 11,802,686 B2
(45) Date of Patent: Oct. 31, 2023

(54) REVERSE STEAM GENERATOR FOR A LEAD-COOLED FAST REACTOR

(71) Applicant: STATE ATOMIC ENERGY CORPORATION "ROSATOM" ON BEHALF OF THE RUSSIAN FEDERATION, Moscow (RU)

(72) Inventors: Sergei Viktorovitch Vasilyev, Moskovskaya obl. (RU); Viktoria Fedorovna Andronitcheva, Moskovskaya obl. (RU)

(73) Assignee: State Atomic Energy Corporation "Rosatom" Acts on Behalf of the Russian Federation, Moscow (RU)

( * ) Notice: Subject to any disclaimer, the term of this patent is extended or adjusted under 35 U.S.C. 154(b) by 0 days.

(21) Appl. No.: 17/413,547

(22) PCT Filed: Jan. 28, 2020

(86) PCT No.: PCT/RU2020/000040
§ 371 (c)(1),
(2) Date: Jun. 12, 2021

(87) PCT Pub. No.: WO2020/122770
PCT Pub. Date: Jun. 18, 2020

(65) Prior Publication Data
US 2022/0065441 A1    Mar. 3, 2022

(30) Foreign Application Priority Data
Dec. 14, 2018   (RU) ........................... RU2018144545

(51) Int. Cl.
*F22B 1/06*   (2006.01)
*F22B 37/12*   (2006.01)
(Continued)

(52) U.S. Cl.
CPC ............. *F22B 1/063* (2013.01); *F22B 37/12* (2013.01); *F22B 1/02* (2013.01); *G21D 1/00* (2013.01); *G21D 1/006* (2013.01)

(58) Field of Classification Search
CPC . F22B 1/02; F22B 1/063; F22B 37/12; G21D 1/00; G21D 1/006; Y02E 30/00
(Continued)

(56) References Cited

U.S. PATENT DOCUMENTS 3,495,556 A * 2/1970 Jukkola ..................... F28D 7/06
110/304
4,276,928 A * 7/1981 Blaskowski .............. F22G 3/00
165/DIG. 65
(Continued)

FOREIGN PATENT DOCUMENTS

JP    2002257967 A    9/2002
RU    1080570 A3    4/1995
(Continued)

OTHER PUBLICATIONS

International Search Report for PCT/RU2020/000040 dated Jun. 5, 2020, 2 pages.

*Primary Examiner* — Steven B McAllister
*Assistant Examiner* — Benjamin W Johnson
(74) *Attorney, Agent, or Firm* — Dentons US LLP

(57) ABSTRACT

Reverse steam generator for a lead-cooled fast reactor. The reverse steam generator comprises a cylindrical body with a bundle of heat exchange tubes located inside, the ends of the heat exchange tubes being fixed in tube sheets with intermediate support grids; inlet and outlet spherical chambers for supplying liquid metal coolant; a lower branch pipe for inlet water; and an upper branch pipe for a steam outlet. The cylindrical body is arranged horizontally and is curved in a Z-shape with a difference in height. The bundle of heat (Continued)

exchange tubes is also made in a Z-shape, repeating the bend of the cylindrical body.

3 Claims, 1 Drawing Sheet

(51) Int. Cl.
 *G21D 1/00* (2006.01)
 *F22B 1/02* (2006.01)

(58) Field of Classification Search
 USPC .................................................... 122/235.23
 See application file for complete search history.

(56) References Cited

U.S. PATENT DOCUMENTS

| | | | | |
|---|---|---|---|---|
| 4,515,748 A | * | 5/1985 | Fabregue | ................ F22B 1/063 |
| | | | | 376/250 |
| 4,836,274 A | * | 6/1989 | Firth | ..................... F28F 9/0131 |
| | | | | 376/250 |
| 9,715,948 B2 | | 7/2017 | Kubintsev et al. | |
| 2016/0336082 A1 | * | 11/2016 | Kubintsev | ............... G21C 15/26 |

FOREIGN PATENT DOCUMENTS

| | | |
|---|---|---|
| RU | 2279604 C1 | 7/2006 |
| RU | 96214 U1 | 7/2010 |
| RU | 2545098 C1 | 3/2015 |
| WO | WO1993/020386 A1 | 10/1993 |

* cited by examiner

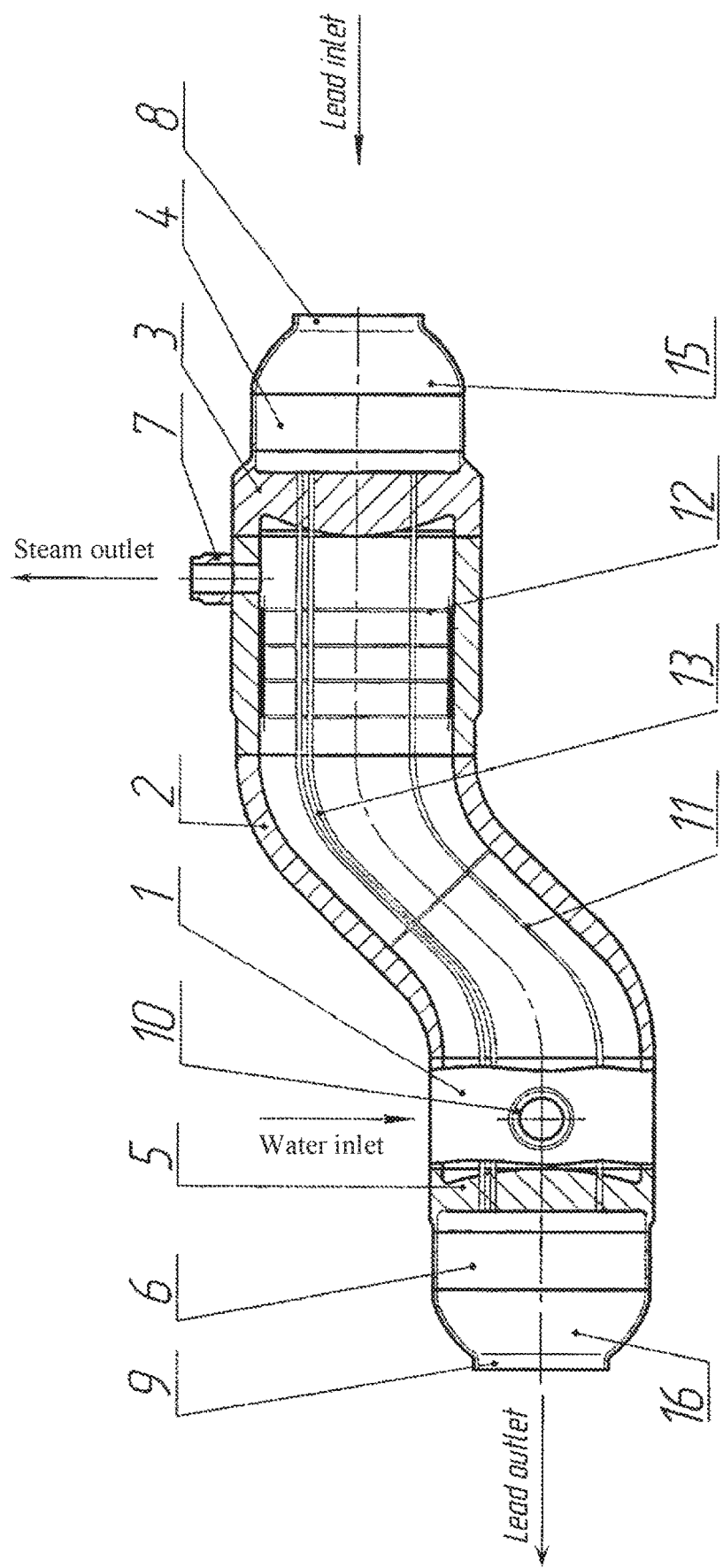

REVERSE STEAM GENERATOR FOR A LEAD-COOLED FAST REACTOR

CROSS-REFERENCE TO RELATED DISCLOSURE

This application is a U.S. National Stage of International Application No. PCT/RU2020/000040 filed on Jan. 28, 2020, published as WO 2020/122770 on Jun. 18, 2020 with the title "INVERSE STEAM GENERATOR FOR FAST NEUTRON REACTOR HAVING LEAD COOLANT," which claims priority to RU 2018144545 filed on Dec. 14, 2018. Each application, publication, and patent listed in this paragraph are hereby incorporated by reference in their entireties.

BACKGROUND

Technical Field

The invention relates to nuclear power, namely to liquid metal cooled steam generators.

Description of Related Art

Known designs of modules of once-through liquid metal cooled steam generators for reactor plants such as BN-600 and BN-800, in which the vertical sections are divided into separate evaporator and superheater sections (Thermal and Nuclear Power Plants. Reference. Edited by V. A. Grigoriev and V. M. Zorin. Moscow, Energoizdat 1982, p. 245 . . . 248). The modules have an internal tube bundle, feed water supply chambers and slightly superheated steam outlet chambers in one module and slightly superheated steam supply chambers and superheated steam remove chambers. In these modules, feed water flows through the tube side, while sodium is inside the body in the annular space. In these modules, heat exchange tubes are sealed in tube plates by mechanical expansion, by welding tubes to tube plates, and by hydraulic expansion. Such structures have a high metal consumption, since the zones of the economizer, evaporator, and superheater are located in different bodies.

A reverse lead-cooled steam generator, which also has a tube bundle inside the body, is the closest in technical essence and achieved result; the lead melt flows through the pipes, and feed water and superheated steam are inside the module body in the annular space (patent RU2545098, publ. on Mar. 27, 2015, G21D1/00).

The disadvantage of the known steam generator is the increased metal consumption for separate evaporator and superheater modules, as well as the complexity of solving problems associated with various temperature elongations of high-pressure bodies and the tube bundle, the lack of self-compensation, as well as high operating costs for pumping lead melt by main circulation pumps to a large height of structures of steam generator vertical modules.

SUMMARY OF ILLUSTRATIVE EMBODIMENTS OF THE INVENTION

The invention objective is to improve the technical and economic characteristics of the steam generator.

The technical result of the invention is a decrease in metal consumption of the structure and an increase in self-compensation of the heat-exchange tubes and body, as well as a decrease in energy consumption by reducing the operating costs for the lead melt pumping. The specified technical result is achieved by the fact that the steam generator cylindrical body is located horizontally and bent in a Z-shape with a difference in height, and the heat exchange tube bundle is also made in a Z-shape, repeating the bend of the cylindrical body. The proposed ratios of geometric characteristics of the steam generator tube bundle and body make it possible to optimally separate the economizer zone and evaporation zone from the steam superheat zone.

BRIEF DESCRIPTION OF THE DRAWINGS

The essence of the claimed invention is illustrated by a drawing, where the FIGURE shows a longitudinal section of the steam generator module.

DETAILED DESCRIPTION

The steam generator 1 contains a Z-shaped body 2, inside which there is a Z-shaped tube bundle 13, the edges of the heat exchange tubes 11 of which are fixed in the tube plates 3 of the "hot" lead supply chambers 4 on one side, and in the tube plates 5 of the "cold" lead removal chambers 6 on the other side. Inside the body, the tube bundle rests on intermediate support grids 12. The spherical bottom 15 with the molten lead coolant inlet branch pipe 8, from the reactor core, and the tube sheet 3 form the inlet chamber 4, and the spherical bottom 6 with the "cold" lead coolant outlet branch pipe 9 and the tube sheet 5 form the outlet chamber 16.

The steam generator is located in a separately fenced-off steam generator box of the NPP containment. The lead coolant melt leaves the reactor core, enters chamber 4 through the branch pipe 8 through the pipeline, then, being distributed over the surface of the tube plate 3, it enters the heat exchange tubes 11 of the tube bundle 13. The cooled lead melt from the pipes 11 flows into the chamber 6 and then returns to the reactor core through the branch pipe 9 through the pipeline. At the same time, the working fluid (feed water at the inlet, overheated steam at the outlet), through the feed water pipeline from the branch pipe 10, enters the body 2 of the steam generator module and the tube bundle 13. In the lower horizontal section of the body 2 and the tube bundle 13, the feed water reaches the saturation temperature, in the vertical section it evaporates, turns into steam, then in the upper horizontal section the generated steam is overheated to the required temperature and, through the upper branch pipe 7 through the hot superheated steam pipeline, it is discharged into the plant turbine.

The claimed technical solution makes it possible to provide self-compensation for thermal expansion of the structural elements of the steam generator, as well as to reduce their weight. Due to the decrease in height differences in comparison with the vertical design of steam generator modules, the requirements for the main circulation pumps for lead coolant pumping are reduced, as well as operating costs are reduced.

What is claimed is:

1. A reverse steam generator for a lead-cooled fast reactor, the reverse steam generator comprising:
   a cylindrical body with a bundle of heat exchange tubes located inside the cylindrical body, wherein ends of the heat exchange tubes are fixed in tube sheets, wherein intermediate support grids support the heat exchange tubes;
   inlet and outlet spherical chambers for supplying liquid metal coolant;
   a lower branch pipe for inlet water; and
   an upper branch pipe for a steam outlet;

wherein the cylindrical body is configured to be arranged horizontally and is curved in an offset-shape defined with (i) a first portion of the cylindrical body and a second portion of the cylindrical body having a height difference relative to one another and (ii) a third portion of the cylindrical body being inclined relative to the first portion of the cylindrical body and the second portion of the cylindrical body such that the third portion of the cylindrical body bridges the first portion of the cylindrical body and the second portion of the cylindrical body and the first portion of the cylindrical body and the second portion of the cylindrical body do not extend one over another and extend from the third portion away from each other in opposing horizontal directions, wherein the first portion has a water inlet oriented at a first direction along a first plane and the second portion has a vertical steam outlet oriented at a second direction perpendicular to the first direction along a second plane different from the first plane, and wherein the bundle of heat exchange tubes is also curved in an offset-shape that matches the offset-shape of the cylindrical body and aligns with the shape of the cylindrical body.

2. The reverse steam generator for the lead-cooled fast reactor according to claim 1, wherein the bundle of heat exchange tubes includes a first portion and a second portion, wherein the height difference between the first portion of the cylindrical body and the second portion of the cylindrical body and the height difference between the first portion of the bundle of heat exchange tubes and the second portion of the bundle of heat exchange tubes is 0.6-0.7 times the diameter of the cylindrical body, and the curvature angle between the third portion of the cylindrical body and the first and second portions of the cylindrical body and a curvature angle between the third portion of the bundle of the heat exchange tubes and the first and second portions of the bundle of heat exchange tubes is 40-45° to horizontal.

3. The reverse steam generator for the lead-cooled fast reactor according to claim 1, wherein each of the first portion, the second portion, and the third portion has a respective beginning and a respective end such that a respective intermediate support grid is positioned only between the respective beginning and the respective end.

\* \* \* \* \*